(12) United States Patent
Scheiner et al.

(10) Patent No.: US 10,072,344 B2
(45) Date of Patent: Sep. 11, 2018

(54) DEVICE AND APPARATUS FOR CARRYING OUT CHEMICAL DISSOCIATION REACTIONS AT ELEVATED TEMPERATURES

(71) Applicant: YEDA RESEARCH AND DEVELOPMENT CO. LTD., Rehovot (IL)

(72) Inventors: David Scheiner, Savyion (IL); Jacob Karni, Rehovot (IL); Raymond A George, Pittsburgh, PA (US); Gabriel Seiden, Rehovot (IL)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 520 days.

(21) Appl. No.: 14/409,144

(22) PCT Filed: Jun. 25, 2013

(86) PCT No.: PCT/IL2013/050540
§ 371 (c)(1),
(2) Date: Dec. 18, 2014

(87) PCT Pub. No.: WO2014/002090
PCT Pub. Date: Jan. 3, 2014

(65) Prior Publication Data
US 2015/0144498 A1 May 28, 2015

(30) Foreign Application Priority Data
Jun. 25, 2012 (IL) .......................................... 220629

(51) Int. Cl.
C25B 9/00 (2006.01)
C25B 15/00 (2006.01)
(Continued)

(52) U.S. Cl.
CPC ............... *C25B 15/00* (2013.01); *B01J 8/067* (2013.01); *B01J 19/248* (2013.01); *C25B 9/00* (2013.01);
(Continued)

(58) Field of Classification Search
CPC .................................. C25B 9/00; C25B 15/00
(Continued)

(56) References Cited

U.S. PATENT DOCUMENTS 3,485,888 A 12/1969 Kuhne
5,554,347 A 9/1996 Busson et al.
(Continued)

FOREIGN PATENT DOCUMENTS

GB 895038 A 8/1908
GB 785752 A 11/1957

OTHER PUBLICATIONS

International Search Report, dated Nov. 11, 2013. In corresponding application No. 2013050540.

*Primary Examiner* — Zulmariam Mendez
(74) *Attorney, Agent, or Firm* — Browdy and Neimark, PLLC

(57) ABSTRACT

A reactor is provided which comprises: a plurality of reaction units located within a reaction zone, each of the reaction units being adapted to enable carrying out a chemical reaction of one or more raw gases (e.g. at least one of $CO_2$ and $H_2O$); ingress means to allow introduction of the one or more raw gases into the reaction zone and to allow distributing the incoming gas to the plurality of reaction units; egress means to allow exit of reaction products from the reaction zone; and a heating system. The reaction units extend essentially along a longitudinal axis of the reaction zone and are arranged in a spaced-apart relationship along a lateral axis of the reaction zone. The heating system com-
(Continued)

prises a plurality of heating sources extending along the reaction zone, thereby providing at least a part of the energy to carry out the reaction process within the reaction units.

21 Claims, 11 Drawing Sheets

(51) Int. Cl.
*B01J 8/06* (2006.01)
*B01J 19/24* (2006.01)
*C25B 9/18* (2006.01)
*F28F 21/04* (2006.01)
*F28D 7/06* (2006.01)
*F28D 7/10* (2006.01)
*F28D 7/12* (2006.01)

(52) U.S. Cl.
CPC ....... *C25B 9/18* (2013.01); *B01J 2219/00078* (2013.01); *B01J 2219/00081* (2013.01); *B01J 2219/00085* (2013.01); *B01J 2219/00135* (2013.01); *B01J 2219/00155* (2013.01); *B01J 2219/00186* (2013.01); *F28D 7/06* (2013.01); *F28D 7/106* (2013.01); *F28D 7/12* (2013.01); *F28F 21/04* (2013.01)

(58) Field of Classification Search
USPC .......................................... 205/304; 204/242
See application file for complete search history.

(56) References Cited

U.S. PATENT DOCUMENTS 8,048,276 B2    11/2011   Balestrino et al.
2002/0081253 A1  6/2002   Abe
2010/0200421 A1  8/2010   Aujollet

DEVICE AND APPARATUS FOR CARRYING OUT CHEMICAL DISSOCIATION REACTIONS AT ELEVATED TEMPERATURES

FIELD OF THE INVENTION

The present invention relates in general to systems used for carrying out chemical reactions, and particularly to solar systems and methods utilizing $CO_2$ and/or $H_2O$ as their raw materials.

BACKGROUND OF THE INVENTION

Devices for carrying out electrolysis reactions are known in the art for various applications, and water and $CO_2$ were proposed to be used as the reactants for such electrolysis reactions. Water may be used as a simple and clean source for hydrogen production, while the latter reactant may be used in the attempt to reduce $CO_2$ emissions.

Although commercial water electrolysis is available at low temperatures by using known technologies, the operational efficiency of such processes is relatively low. On the other hand, use of high temperature solid-oxide cell technology is restricted by the need to use high temperature cells that would operate typically within the range of 800° C. to 1000° C. However, in order to operate at such temperatures, one would be required to use heaters which in turn reduce the overall effectiveness and consequently the ability to adopt such approaches.

Unfortunately, the cost of the equipment for water electrolysis is quite significant, thereby making water electrolysis to be a too expensive option for hydrogen production when compared with steam re-forming of natural gas or other hydrocarbons.

One attempt to deal with the problem is described in U.S. Pat. No. 8,048,276, which discloses solid oxide stacks used as fuel cells to generate electricity from hydrogen or other sources. According to the disclosure provided in this publication, an incident heat source is used through a heat exchanger heating compressed air flow, or recycling of a proportion of exhaust from the stack, or combustion of a product from stack disassociation, thereby reducing the amount of expensive electrical supply required to achieve dissociation.

SUMMARY OF THE DISCLOSURE

There is a need in the art for a novel approach that provides an adequate solution which enables to carry out efficiently certain dissociation reactions at elevated temperatures that are suitable for example for use in harvesting solar radiation or for any other high-temperature reaction, to receive the desired dissociation products.

The present invention provides a method and apparatus for carrying out dissociation reactions, such as electrolysis, at elevated temperatures. The technique of the present invention provides for reducing $CO_2$ emission by using it as feedstock for fuel generation. Also, the technique of the present invention provides for reducing the need for sequestration of $CO_2$ captured in power plants and other $CO_2$ emitting facilities.

In the technique of the present invention the raw gas is being efficiently heated to the required elevated temperatures for the reaction to take place. This is achieved by proper arrangement of reaction units in a reaction zone, and heating the reaction units by proper configuration of a heating system so as to define heating paths in the reaction zone to thereby provide very efficient heat transfer to the reaction units. Also, the invention provides for optimization of convective heat transfer to the units by control of the gas flow.

The heating system comprises a plurality of heat sources within the reaction zone to supply at least a part of the energy required for the reactions in the reaction units. The heat sources may comprise physical heating elements through which gas being heated flows through the reaction zone. The physical heating elements may include internal heating elements passing through the respective reaction units, or external heating elements (u-shaped tubes or annular tubes) located aside the reaction unit(s), being interposed between the adjacent reaction units. The heat sources may be constituted by regions/spaces between the reaction units and a region around the array of reaction units through which the heating gas flows, such that the heating gas is in direct contact with the reaction units.

According to one aspect of the invention, there is provided a reactor comprising:

a plurality of reaction units located within a reaction zone in the reactor, each of the reaction units being adapted to enable carrying out a chemical reaction of one or more raw gases (e.g. including at least one of $CO_2$ and $H_2O$); ingress means operative to allow introduction of the one or more raw gases into the reaction zone and to allow distributing the incoming one or more raw gases to the plurality of the reaction units;

egress means operative to allow exit of reaction products from the reaction zone; and a heating system;

wherein the reaction units extend essentially along a longitudinal axis of the reaction zone and are arranged in a spaced-apart relationship along a lateral axis of the reaction zone; and the heating system comprises a plurality of heating gas sources extending along the reaction zone thereby providing at least a part of the energy to carry out the reaction process within the plurality of reaction units.

As indicated above, the heating gas sources may be formed by (i) a plurality of internal heating elements each extending longitudinally along (e.g. a center of) the respective one of the plurality of the reaction units, (ii) one or more external heating elements interposed between the adjacent reaction units, and (iii) an array of heating paths defined by spaces between the adjacent reaction units and a region of the reaction zone around the reaction units such that the heating gas is in direct contact with the reaction units which are surrounded by the heating gas.

It should be understood by any person skilled in the art that although $CO_2$ is sometimes referred to specifically in the disclosure as the raw gas, it is used to represent any incoming raw gas, whereas CO may be regarded as being used to represent exiting gas product. Depending on specific operating conditions, the raw gas could be a mixture of CO and $CO_2$ of relatively low CO content, while the exiting gas could be a $CO/CO_2$ mixture of higher CO content. The gases could also contain various mixtures of $H_2O$ and its dissociation products.

According to another embodiment, the one or more heat sources interposed between the adjacent reaction units include at least one of the following: heated gas, such as air, oxygen, $CO_2$ and a mixture thereof, flowing along the outer envelope of reaction units, or heating elements (e.g. electrical elements) located along the reaction units and radiating thereon, and any combination thereof.

In accordance with yet another embodiment, the heat sources extending longitudinally along the center of the respective reaction units are selected from the following: a tube through which heated gas is flowing along the respective reaction unit, a heating element (e.g. an electrical element) located along the reaction unit, a heating element located within a tube that extends along the respective reaction unit and the like.

According to still another embodiment, each of the plurality of reaction units in the reactor has at one of its ends an opening configured to enable introduction of the raw gas into the reaction unit and withdrawal of at least one of the reaction products therefrom, and the opposite end being blocked (thereby preventing flow of gases through that blocked end).

By yet another embodiment, the reactor further comprises fluid transfer and mixing units, operative to combine the reaction products into syngas.

According to still another embodiment, the reactor comprises or is configured for communication with a controller operative to control the electrolysis products' molar mixing ratio, in order to enable producing syngas.

According to another aspect of the invention, there is provided a reaction unit adapted to enable carrying out a dissociation reaction of one or more raw gases (e.g. an electrolysis process, e.g. of $CO_2$ and/or $H_2O$) at elevated temperatures, wherein the reaction unit comprises:
an active (e.g. electrolysis) shell, through which said one or more raw gases are conveyed and in which the dissociation process occurs, said active shell at one end thereof having an opening configured for introduction of the one or more raw gases into the reaction unit and to withdraw at least one of reaction products from the reaction unit;
an inner shell defining a heating path, the inner shell passing through the active shell and being configured to define a space of the active shell around the inner shell for said flow of the one or more raw gases.

According to yet another aspect, there is provided a reaction unit adapted to enable carrying out a dissociation reaction of one or more raw gases (e.g. an electrolysis process, e.g. of $CO_2$ and/or $H_2O$) at elevated temperatures, wherein the reaction unit comprises:
an active shell, through which said one or more raw gases are conveyed and where the dissociation process occurs, said active shell at its first end having an opening configured for introduction of the one or more raw gases into the reaction unit and to withdraw at least one of reaction products therefrom, and having a blocked opposite end to prevent any flow of gases through the blocked end;
an inner shell passing through the active shell and being configured to define a space of the active shell around the inner shell for said flow of the one or more raw gases.

According to another aspect there is provided a reaction unit adapted to enable carrying out a dissociation reaction of one or more raw gases (e.g. an electrolysis process, e.g. of $CO_2$ and/or $H_2O$) at elevated temperatures, wherein the reaction unit comprises:
an active shell through which said one or more raw gases flow and where the dissociation reaction occurs, said active shell having an opening configured for introduction of the one or more raw gases into the reaction unit and to withdraw at least one of reaction products therefrom;
an inner shell passing through the active shell and being configured to define a space of the active shell around the inner shell for said flow of the one or more raw gases; and
an outer shell surrounding said active shell to confine at least one product of the reaction process flowing in a space surrounding the active shell.

According to some embodiments, the reaction unit is configured such that the product of the reaction process (e.g. $O_2$ product) flows in a space which is defined by the outer shell surrounding the active shell (and this product is withdrawn from said space).

The configuration may be such that the outer shell may be configured to be dedicated to the respective active shell, i.e. the outer shell is associated with the single reaction unit contains one active shell. According to another example, one outer shell is common for more than one active shells, i.e. the same outer shell is associated with more than one reaction units. According to yet another example, more than one outer shell is provided, i.e. at least one internal outer shell located inside an external outer shell. In this case, the external outer shell is common for the entire arrangement of reaction units (active shells), while the internal outer shell(s) may include a single shell for multiple reaction units (active shells) or may include multiple outer shells for containing multiple active shells respectively.

For example, the product (e.g. $O_2$) of the reaction process flows in a space confined by the outer shell surrounding the multiple active shells of the reaction unit (and withdrawn therefrom).

Preferably, at least one other product of the reaction process (e.g. CO or the combination of CO and $CO_2$, in the case of $CO_2$ electrolysis for example), flows through the space confined between the inner shell and the active shell (e.g. through the annulus formed by the two shells in case of a tubular reaction unit).

The active shell of the reaction unit may be made from at least one of the following materials: Yttria-stabilized zirconia, Gadolinium doped Ceria, Nickel Yttria stabilized Zirconia, Lanthanum Strontium Manganite and the like.

According to some embodiments, the active shell comprises at least three layers, including a cathode layer, an electrolyte layer and an anode layer. It should be appreciated that more than three such layers may be used without departing from the scope of the present invention. Preferably, one of the layers acts as a supporting structure whereas the other two layers may be added as coatings or any other build-up technologies such as deposition, plasma spraying etc. onto the supporting structure.

According to yet another aspect of the invention, there is provided a reaction unit adapted to enable carrying out a dissociation reaction of one or more raw gases (e.g. an electrolysis process, e.g. of $CO_2$ and/or $H_2O$) at elevated temperatures, wherein the reaction unit comprises:
an active shell through which said one or more raw gases flow and where the dissociation reaction occurs; and
an internal heating element passing through the active shell and being configured to define a space of the active shell around the heating element for said flow of the one or more raw gases.

The heating element may extend longitudinally along the central axis of the reaction unit (e.g. in case of a tubular reaction unit).

The heating element may be of any of the following configurations: a tube through which a heated gas is flowing along the reaction unit, an electrical element, a heater located within a tube, and the like.

The present invention in its yet further aspect, provides a method for controlling a dissociation reaction of at least one of $CO_2$ and $H_2O$ raw gases at elevated temperatures. The method comprises:

providing a reactor comprising a reaction zone, gas ingress for introducing said at least one of $CO_2$ and $H_2O$ raw gases into the reaction zone, and gas egress for discharging reaction products from the reaction zone, and an arrangement of multiple chemical reaction units made of high temperature materials in the reaction zone, said reaction units extending along a reaction zone and arranged in a spaced-apart relationship across the reaction zone;

providing a plurality of heating sources in said reaction zone extending along the multiple reaction units;

introducing said at least one of $CO_2$ and $H_2O$ raw gases into the reaction zone and distributing the one or more raw gases to pass through the multiple reaction units, and applying high-temperature heating to the reaction units, thereby providing at least a part of the energy to carry out the reaction process within the multiple reaction units.

BRIEF DESCRIPTION OF THE DRAWINGS

The present invention will be understood and appreciated more fully from the following detailed examples taken in conjunction with the drawings in which.

DETAILED DESCRIPTION OF EMBODIMENTS

The present invention will be understood and appreciated more fully from the following detailed examples taken in conjunction with the drawings.

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a thorough understanding of the present invention. It should be apparent, however, that the present invention may be practiced without these specific details, or while using other details.

Figure 1A:
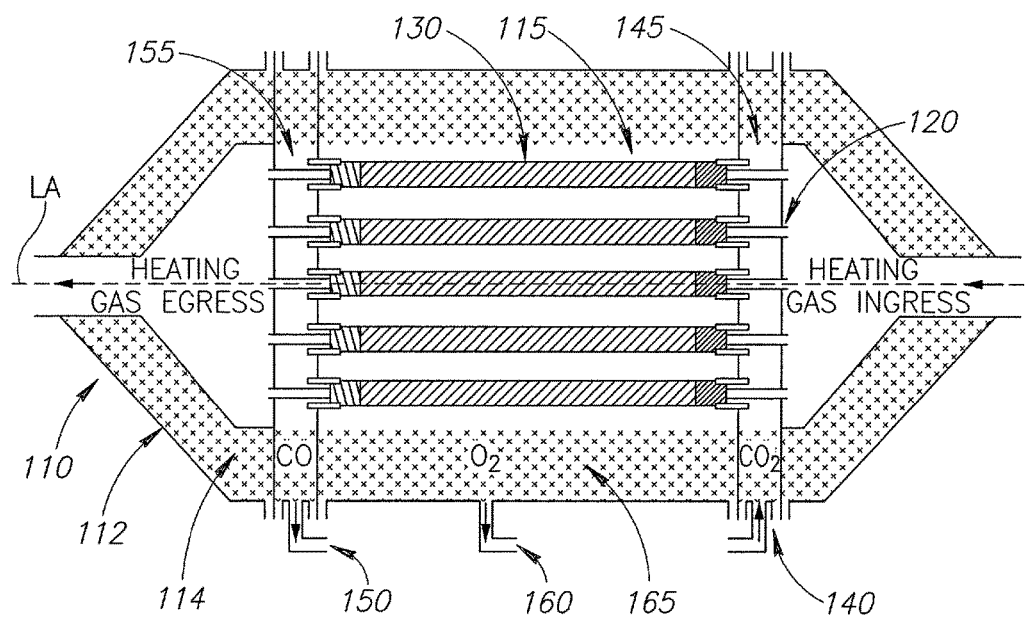
FIG. 1A illustrates a schematic representation of an example of a reactor of the invention comprising a plurality of open ended reaction units.

FIG. 1A illustrates a schematic representation of an example of a high-temperature reactor 110 configured and operable according to the invention. The reactor 110 comprises a plurality of reaction units 130, which in this specific but not limiting example are configured as open ended units. The reactor 110 is encased in a sealed case 112, preferably formed of metal sheet and covered at its inside by an insulating material 114, preferably ceramic, to reduce thermal energy loss. The reaction units 130 are configured and operable to enable carrying out a chemical reaction (e.g. an electrolysis process) of one or more raw gases, including for example $CO_2$, or $H_2O$ or a combination of both. The sealed case 112 of the reactor is formed with ingress means 140 operative to allow introduction of the raw gas(es) into a reaction zone 115 where the reaction units are located and to allow distributing the raw gas to the plurality of the reaction units. The sealed casing 112 also acts as an outer shell to confine at least one product of the reaction process flowing in the space surrounding at least one active shell. This will be described more specifically further below. Further provided in the sealed case 112 is egress means 150, 160 operative to allow exit of reaction products from the reaction zone.

As shown in the figure, the reaction units 130 extend essentially along a longitudinal axis LA of the reactor 110 and are arranged in a spaced-apart relationship along at least one lateral axis of the reactor.

Further provided in the reactor 110 is a gas heating system. Generally, the heating system is configured to define heating sources in the reaction zone to thereby provide very efficient heat transfer to the reaction units and enabling control of the gas flow to optimize convective heat transfer to the reaction units. The heating system may utilize physical heating elements extending along the reaction zone (e.g. heating elements through which heated gas flows through the reaction zone). Alternatively, such heating system (heating sources) may be constituted by an array of heating paths for the gas flow therethrough defined by spaces between the adjacent reaction units and a region of the reaction zone around the reaction units such that the heating gas is in direct contact with the reaction units. In other words, the arrangement of the reaction units defines a pattern of heating paths forming together a heating system.

In the specific not limiting example of FIG. 1A, the heating system utilizes an arrangement of heating elements 120 which are internal with respect to the reaction units 130, each of the heating elements extending longitudinally along the center of the respective one of the reaction units 130. Energy required to carry out the reaction process within the plurality of reaction units 130 is at least partially derived from the internal heat sources 120.

As will be exemplified further below, the heat source arrangement may alternatively or additionally include one or more external heat sources/elements interposed between the adjacent reaction units 130. Accordingly, at least part of energy required for the reaction process is additionally or alternatively derived from said one or more external heat sources interposed between the adjacent reaction units.

Thus, each of the reaction units includes the internal heating element (e.g. tube) 120. The flow of raw gas(es), for example $CO_2/CO$ flow, is conveyed along an annular space in the reaction unit around the heating tube. As better seen in FIG. 1C, this is a space 121 confined between an outer surface 122 of the internal heating tube 120 (inner shell) and an inner surface 131 of an active shell 132 of the reaction unit 130 (i.e. along the annulus formed between the two).

Heated gas (e.g. air) enters the high-temperature reactor at say 1050° C., distributed to the plurality of heating elements 120, and flows within the respective reaction units 130. After providing at least a part of the energy required to carry out the reaction within the reaction unit, the heating gas leaves the high-temperature reactor at a reduced temperature, for example about 950° C. Generally, the temperature of the heated gas is reduced by 10%-50% during the gas passage through the reaction zone, thereby providing at least a part of the energy required for the reaction in the reaction units.

The raw gas $CO_2$ in this example enters via ingress means 140 into a manifold 145, and is conveyed along the space 121 confined between the outer surface 122 of the internal heating tube 120 and the inner surface 131 of the active shell 132 of the reaction unit 130, and the products, CO and $O_2$, of the $CO_2$ dissociation reaction are withdrawn from the reactor via respectively a manifold 155 and then egress means 150, and via a collecting volume 165 and then egress means 160.

The heating elements 120 may be tubes made of various materials including high-temperature metal alloys such as Inconel, ceramic tubes such as alumina or SiC.

Although this example illustrates a case where the heating of the reaction units is done by gas flowing through heating elements 120, it should be understood that heating elements 120 may be any linear electrical heat source including resistive heating coils. Also, it should be noted that the electrical energy for operating the electrical heat source can be derived from any source including renewable energy.

Figure 1B:
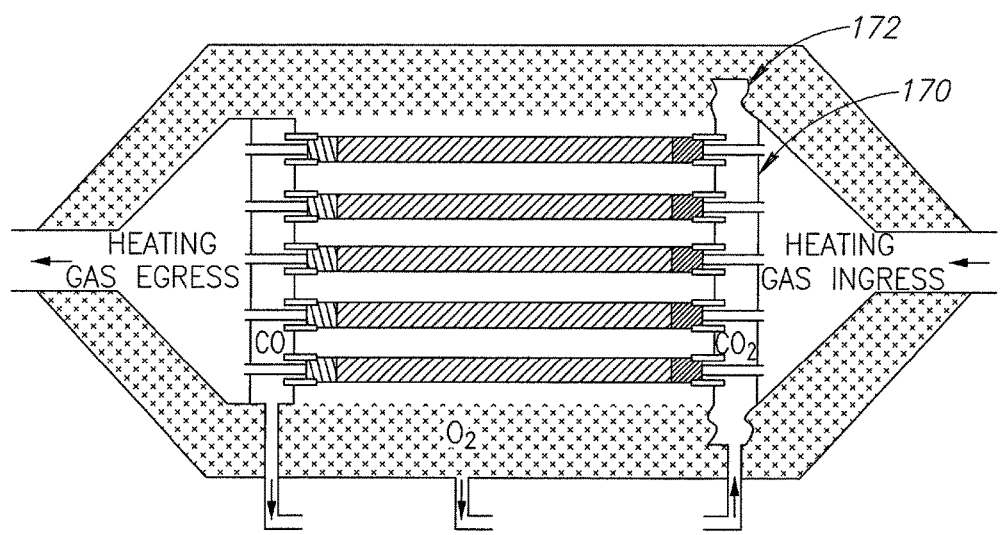
FIG. 1B illustrates a similar example to the one illustrated in FIG. 1A with the exception that floating manifolds are used to introduce gases to the reaction units.

FIG. 1B illustrates a somewhat similar example to the one illustrated in FIG. 1A with the exception that floating manifolds are used to distribute the heating gas (e.g. air) and $CO_2$ to the reaction units. This solution enables to overcome problems associated with the radial and longitudinal expansion at the edge seals of the manifold plates. Bellows or other stress relaxation mechanisms 172 are associated with plates 170.

Figure 1C:
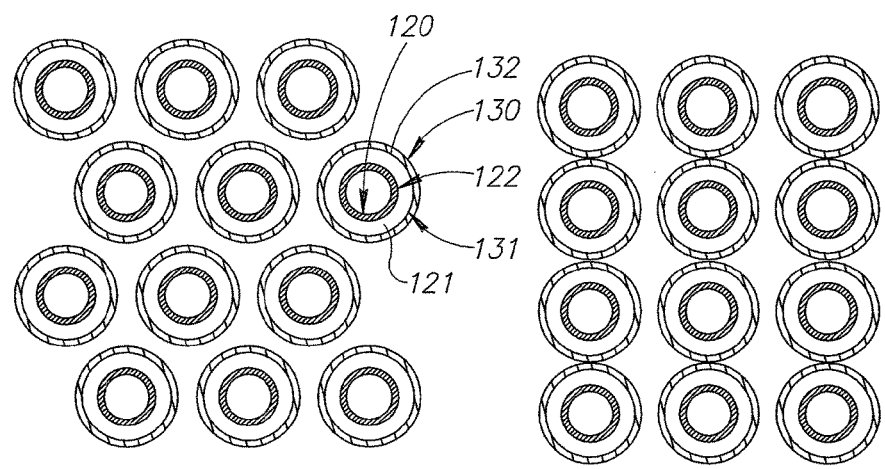
FIG. 1C illustrates a cross section view of the reaction units arrangement in the reactor of FIGS. 1A and 1B.

FIG. 1C exemplifies a cross section of tubular reaction units with heating elements as demonstrated in FIG. 1A and FIG. 1B.

Figure 2A:
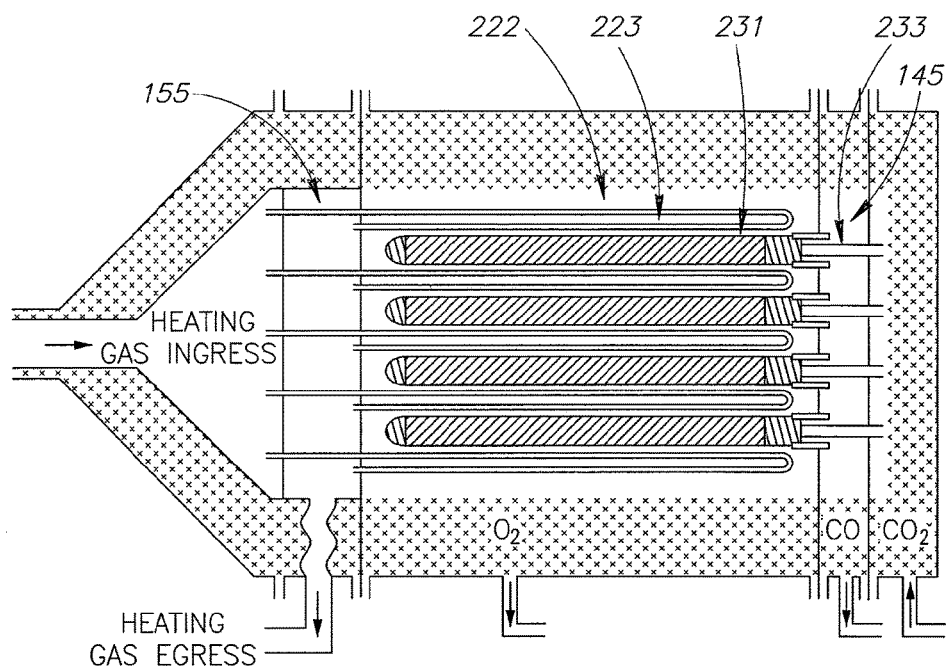
FIG. 2A illustrates a schematic representation of another example of a reactor of the present invention comprising closed end reaction units and loop heaters interposed therebetween.
Figure 2B:
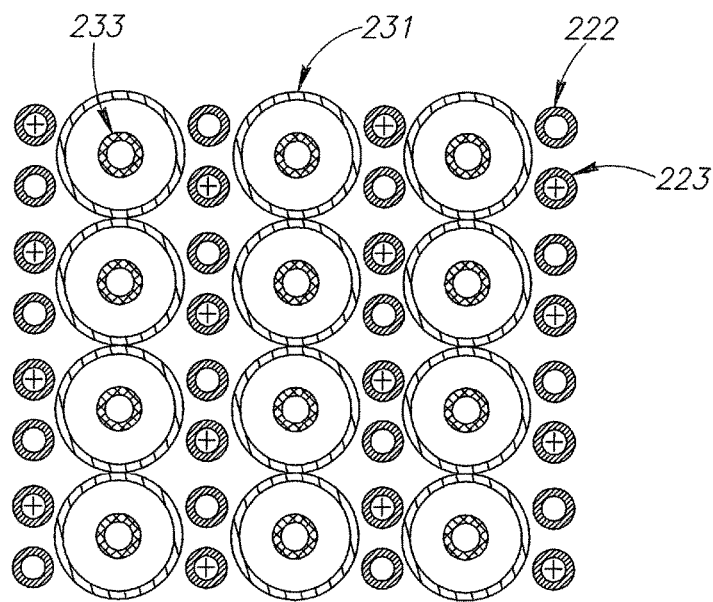
FIG. 2B illustrates a cross section view of the reaction units and loop heaters arrangement in the reactor of FIG. 2A.

FIG. 2A illustrates a schematic representation of an embodiment of the present invention of a reactor which is configured generally similar to those of FIGS. 1A to 1C but in which the reaction units are configured as closed end units and the heat source arrangement includes one or more external heat sources interposed between the reaction units. In this specific but not limiting example, such an external heat source is configured as a loop heater 222-223 or U-tube heaters. Also, in this specific example, multiple external heat sources are provided including those located between the locally adjacent reaction units and around the array of the reaction units as illustrated in FIG. 2B, and are connected to heating gas manifolds 155 at the opposite side from the reaction gas manifolds 145. The raw $CO_2$ gas enters in this example the closed end reaction units 231 via an inner shell 233 acting as a feed-tube.

The inner shell 233 can be made of high temperature alloys or ceramic materials. The loop heater (U-tube) 222-223 can be made of high temperature alloys and certain types of ceramic materials such as SiC.

As will be further demonstrated, the direction reversal of the heating gas flow, and the resulting reversal of roles of the plenums of the heating gas manifold, is possible. Also, as will be further shown, the direction of raw $CO_2$ gas flow can be reversed whereby the inner shell 233 would act as a collection tube.

FIG. 2B illustrates a possible layout of the loop heaters 222-223 and the relative position of the incoming heating gas flow (marked by (+) signs in the tubes) and outgoing heating gas flow. The circumferential heat uniformity of the reaction units is maintained by the lateral circumferential thermal conductivity of the reaction units.

Comparing the concept of using closed end reaction units and heating elements interposed between them, with the open end solution illustrated in FIG. 1A and FIG. 1B, the closed end configuration provides minimal length expansion related stress, and using a heating manifold as a unified welded unit.

Figure 3A:
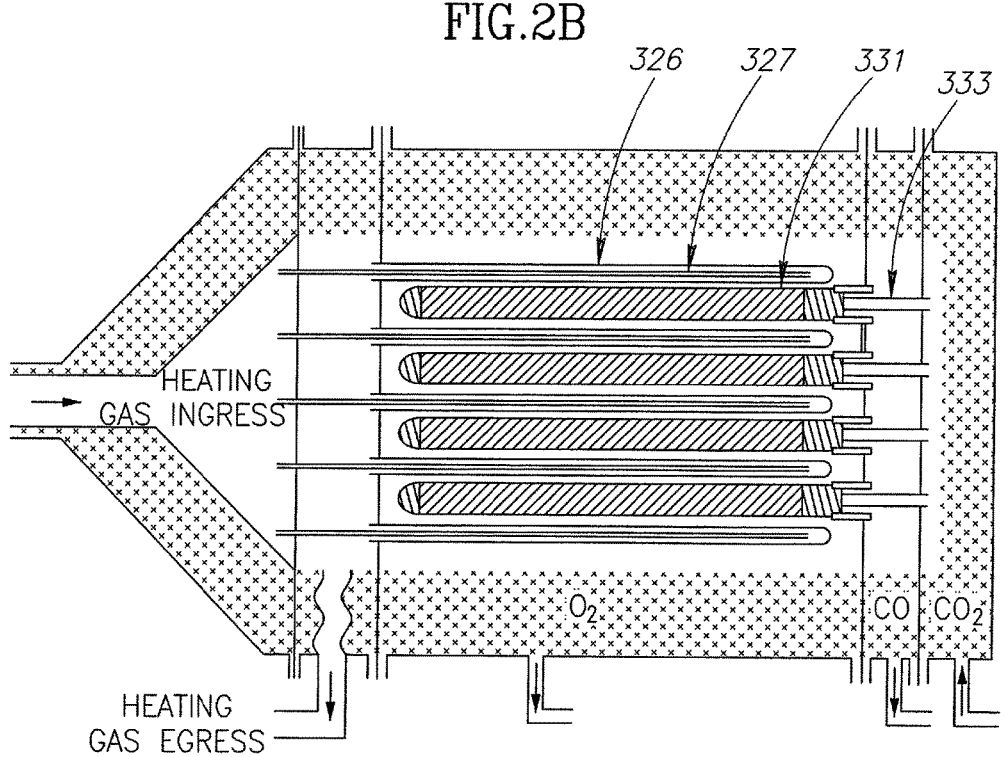
FIG. 3A illustrates a schematic representation of yet another example of a reactor of the invention comprising closed end reaction units and annular heaters interposed therebetween.
Figure 3B:
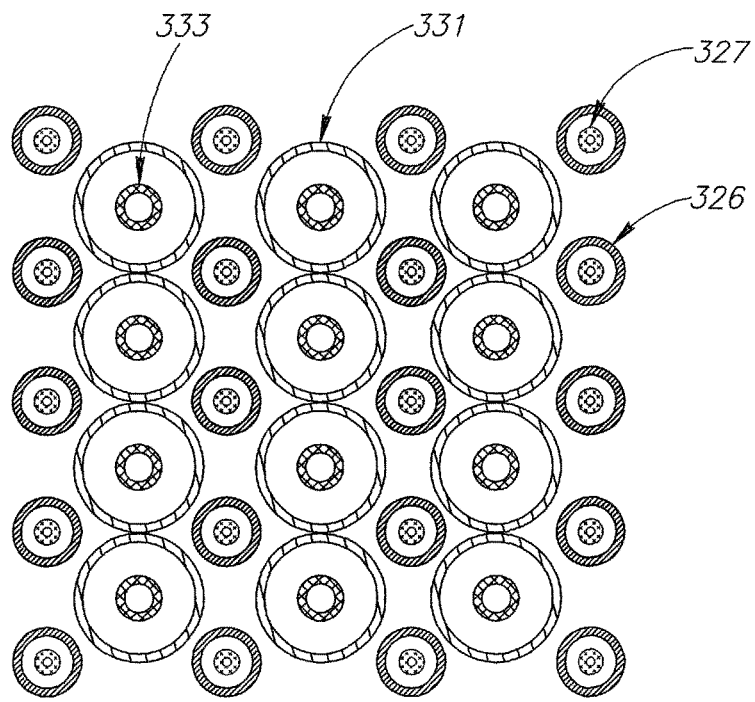
FIG. 3B illustrates a cross section view of the reaction units and annular heaters arrangement in the reactor of FIG. 3A.

FIG. 3A illustrates another schematic representation of a reactor comprising closed end reaction units configured similar to the example of FIGS. 2A and 2B, and a heat source arrangement formed by one or more external heat sources including one or more annular heating tubes located between the adjacent reaction units. In the present example, an array of such annular heating tubes is provided being interposed between the reaction units, and around the array of the reaction unit as illustrated in FIG. 3B, and connected to manifolds at the opposite side from the reaction gas manifolds. An annular heating tube is actually defined by an assembly formed by an outer heating tube 326 and inner heating tube 327 extending inside and along the tube 326. The heating gas flows along the inner heating tube 327 and returns via the outer heating tube 326. This configuration advantageously provides for minimizing possible stress and related bending of the loop heaters due to differential thermal expansion caused by temperature gradients, and enables simple implementation of ceramic materials for the annular heating tubes.

As will be further demonstrated, the direction reversal of the heating gas flow, whereby the heating gas flows along outer heating tube 326 and returns via an inner heating tube 327 and the resulting reversal of roles of the plenums of the heating gas manifold is possible.

FIG. 3B illustrates a possible layout of the reactor comprising annular heaters 326, 327. The circumferential heat uniformity of the reaction units is maintained by the lateral thermal conductivity of the reaction units.

Figure 4:
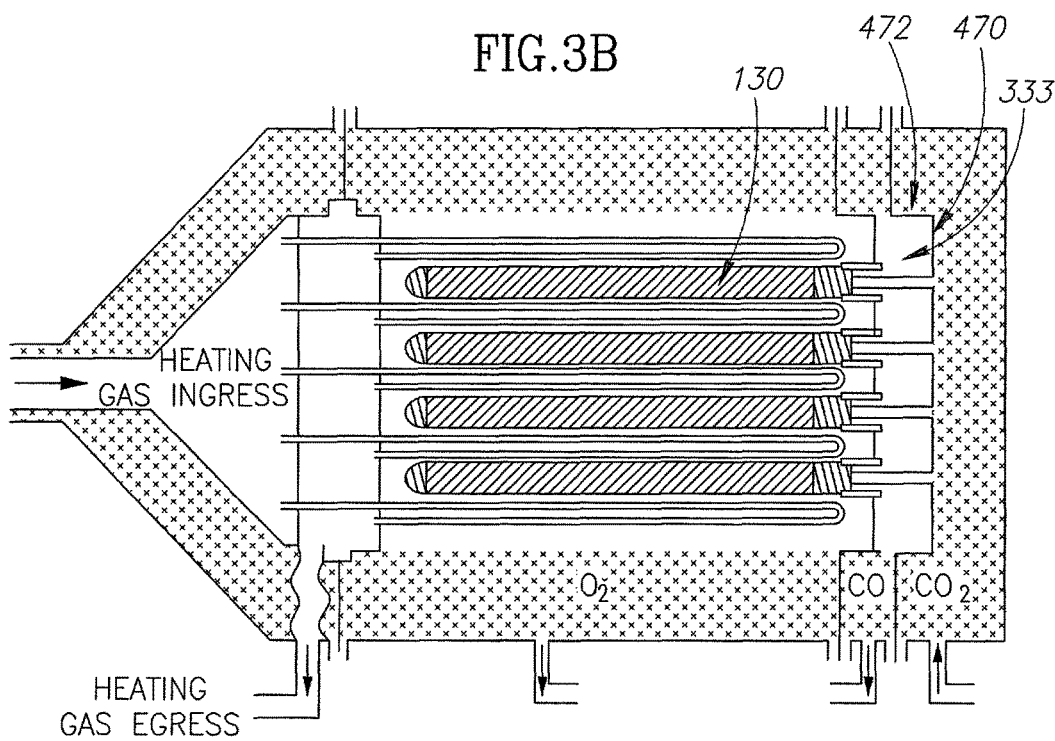
FIG. 4 presents a schematic representation of yet another example of a reactor of the invention comprising closed end reaction units and having a radial "strain relief" configuration.

FIG. 4 presents still another schematic representation of a reactor comprising closed end reaction units, and a heat source arrangement/system including external heating sources/tubes, where the plates 470 holding inner shells 333 (feed tubes) are in a radial "strain relief" configuration whereby flexible elements such as bellows 472 are inserted in plates 470. Such strain relief configuration may reduce possible bending of the plates 470, thereby preventing tilting of feed tubes 333 and reaction units 130 relative to their axis.

Figure 5:
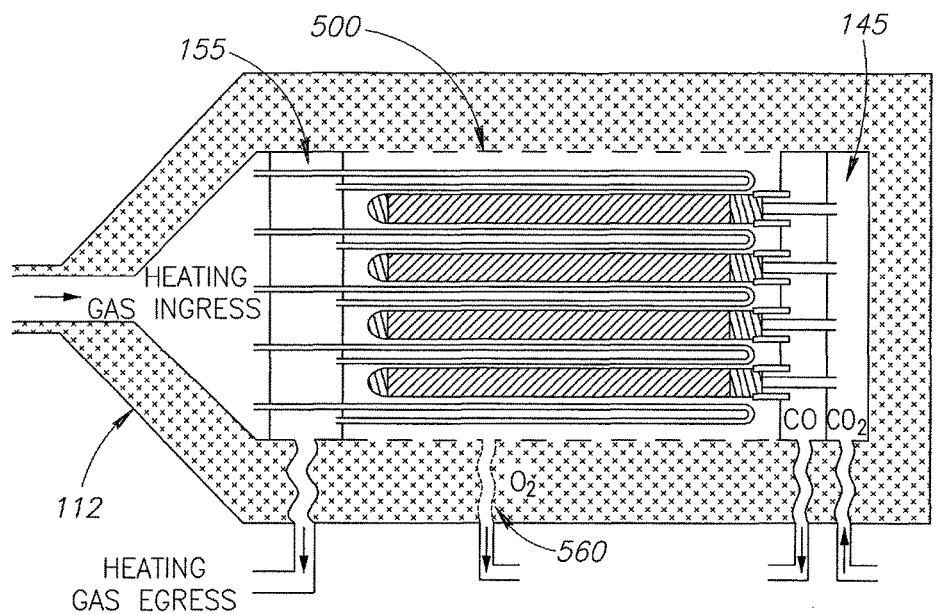
FIG. 5 demonstrates yet another example of a reactor of the invention comprising closed end reaction units and having u-tubes heating elements and floating manifolds.

FIG. 5 demonstrates another schematic representation of a reactor comprising closed end reaction units and having U-tubes heating elements and floating manifolds, whereby the manifolds do not have a direct mechanical connection to the reactor envelope 112. In this example, an enclosure 500 may optionally be used in order to maintain the relative lateral concentric position of the heating gas and reaction gas manifolds 155 and 145 respectively and to reduce possible cross leakage between $O_2$ and CO.

In some embodiments, the enclosure 500 may be sealed and an appropriate (e.g. flexible) connection 560 be added. Such enclosure may thus act as an outer shell of the arrangement of reaction units to confine at least one product of the reaction process flowing in the space surrounding the reaction units. Generally, as indicated above, the reactor may include an internal outer shell (e.g. 500) and an external outer shell 112, where the external outer shell is common for all the reaction units, while internal outer shell may also be common for all reaction units (as shell 500), or may include multiple outer shells for containing multiple active shells, or may be formed by dedicated shells associated with the respective reaction units, i.e. surrounding the active shells of the reaction units.

Figure 8A:
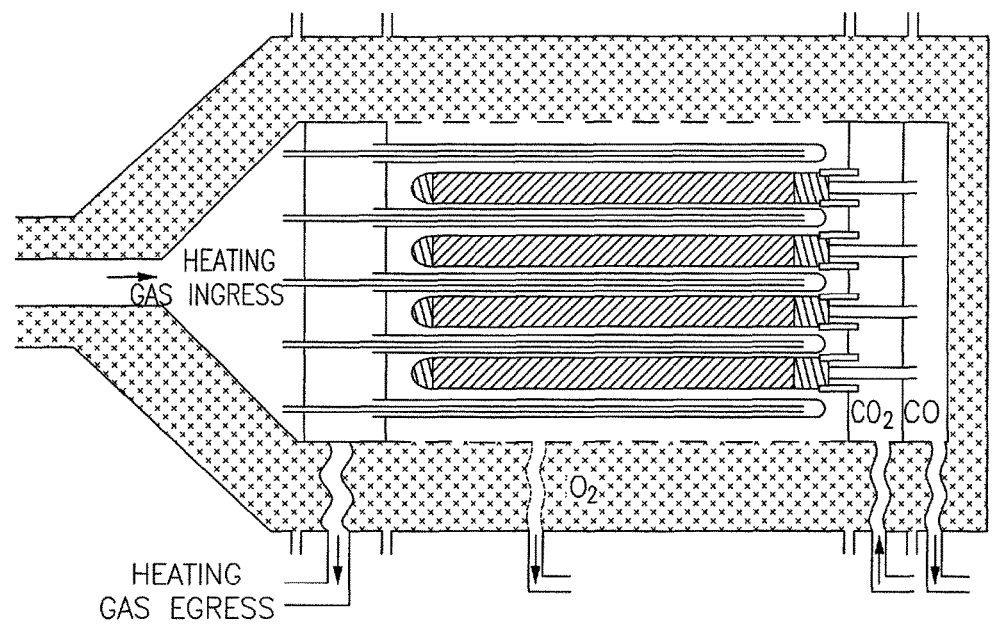
FIG. 8A illustrates an example of a reactor similar to the one presented in FIG. 7, and FIGS. 8B to 8D illustrate a closer view of certain parts thereof.
Figure 8B:
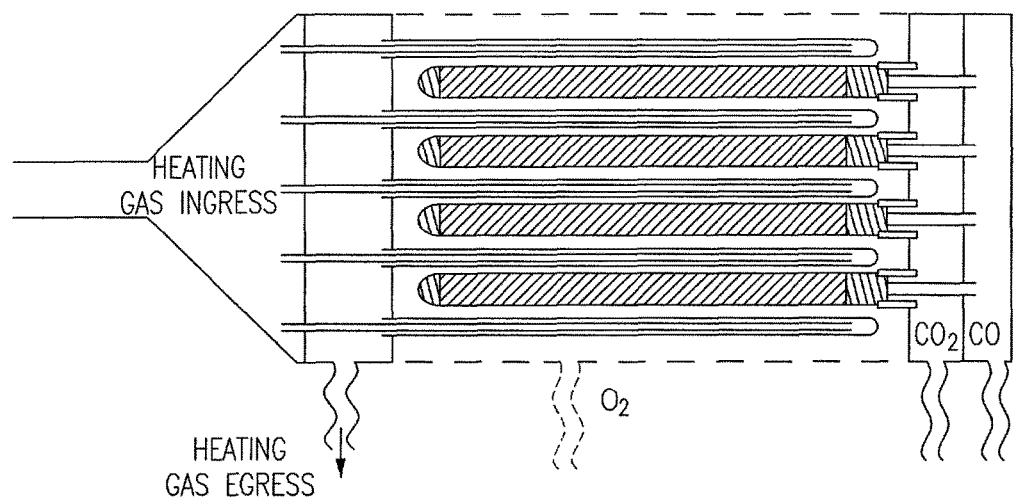
Figure 8C:
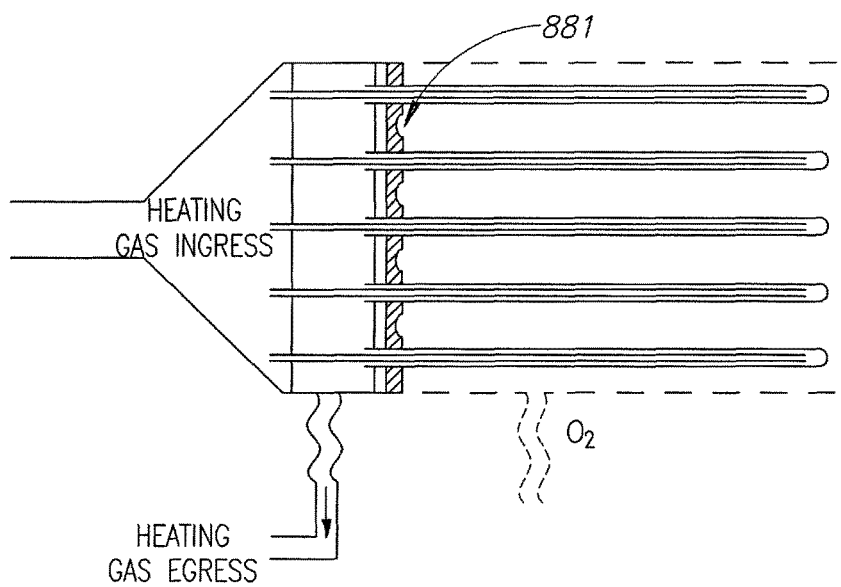
Figure 8D:
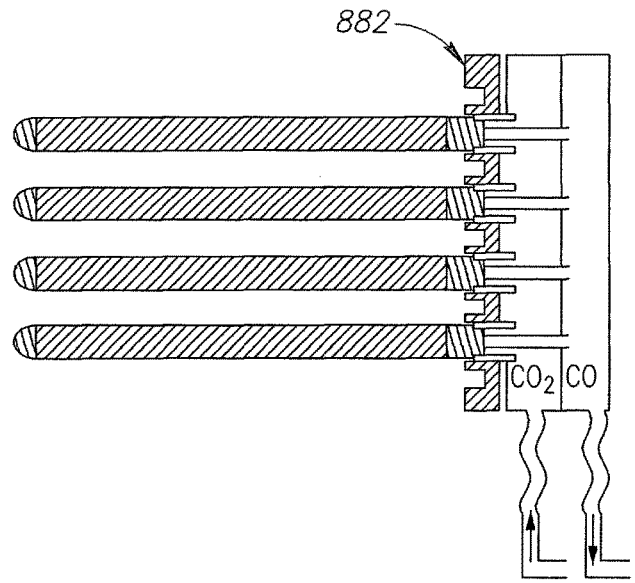

The relative position of reaction units in relation to the heating elements may be maintained stable by mechanisms such as those illustrated in FIGS. 8C and 8d.

Figure 6:
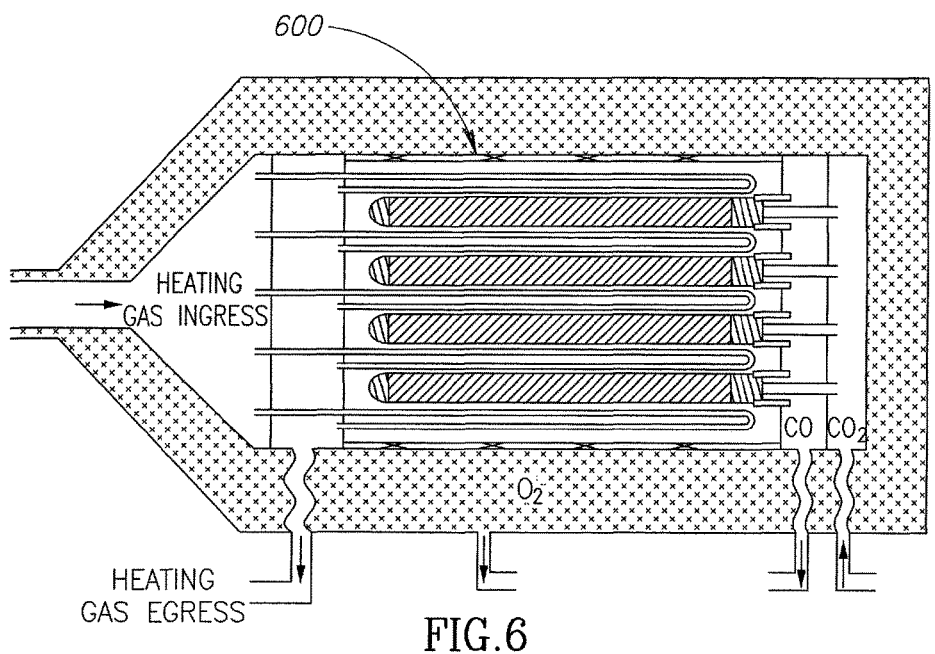
FIG. 6 illustrates yet further example of a reactor of the invention comprising closed end reaction units and having u-tubes heating elements and floating manifolds.

FIG. 6 illustrates another schematic representation of a reactor comprising closed end reaction units and a heat source arrangement having U-tubes heating elements and floating manifolds, and which optionally includes a telescopic mechanism such as telescopic rods 600 for aligning the manifolds concentrically.

Figure 7:
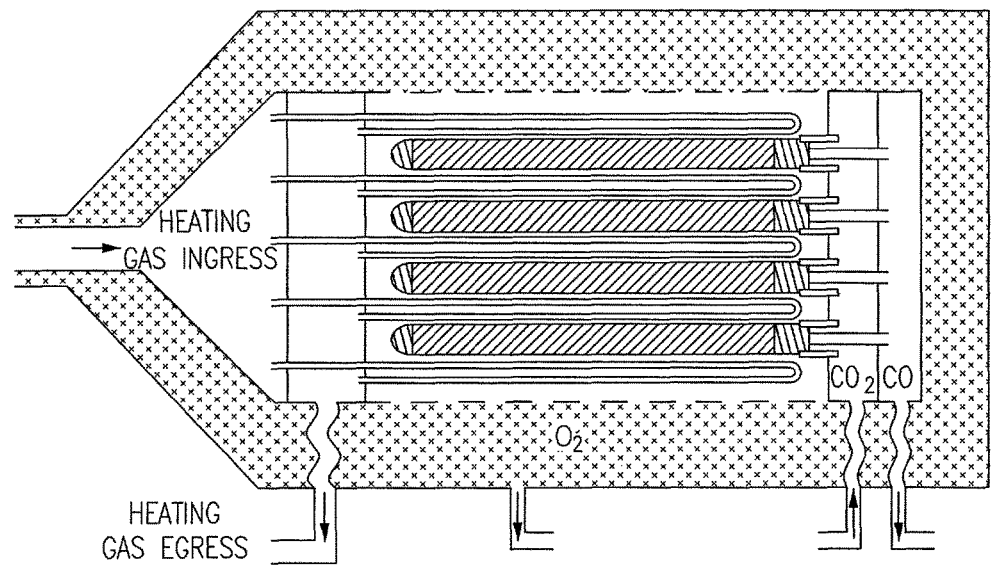
FIG. 7 exemplifies a reactor of the invention comprising closed end reaction units and having annular heating tubes, floating manifolds and reversed $CO_2/CO$ flow direction.

FIG. 7 presents another schematic representation of a reactor comprising closed end reaction units and a heat source arrangement having loop heating elements, floating manifolds and reversed $CO_2$/CO flow direction.

FIG. 8A presents another schematic representation of a reactor comprising closed end reaction units and a heat source arrangement having annular heating elements, floating manifolds and reversed $CO_2$/CO flow direction. FIGS. 8B to 8D illustrate a closer view of certain parts of the reactor of FIG. 8A.

FIG. 8B illustrates the reactor of FIG. 8A where the sealed casing 112 and insulating material 114 has been removed.

FIG. 8C shows the heating assembly/arrangement of the reactor illustrated in FIG. 8A. Flexible insulating support 881 may be used to maintain the position of the reaction units with respect to the heating elements after assembly.

FIG. 8D demonstrates the reaction units' assembly of the reactor illustrated in FIG. 8A. Flexible insulating support 882 may be used to maintain the position of heating elements with respect to the reaction units after assembly.

Figure 9:
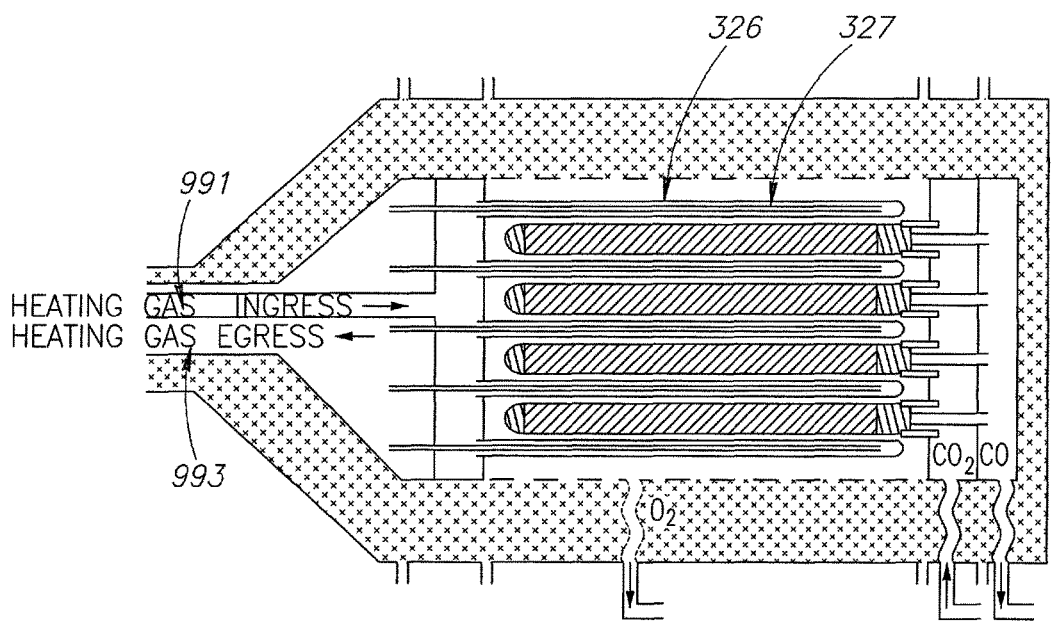
FIG. 9 illustrates an example of a reactor similar to the one shown in FIG. 8A, in which the gas heating the reaction units flows differently.

FIG. 9 illustrates a reactor similar to the one shown in FIG. 8A, in which the gas heating the reaction units flows differently from the way it flows in the FIG. 8A example. In the example of FIG. 9, the heating gas enters the high-temperature reactor at ingress 991 flows in along outer tubes 326, returns via the inner tubes 327, and leaves the high-temperature reactor at egress 993. Ingress means 991 and egress means 993 may be arranged in an annular configuration, with the hotter ingress means through which the hotter gas is conveyed, located at the inner part of annulus, thereby minimizing thermal losses. The direction of heating gas flow as well as the resulting reversal of roles of the plenums of the heating gas manifold is possible.

Figure 10:
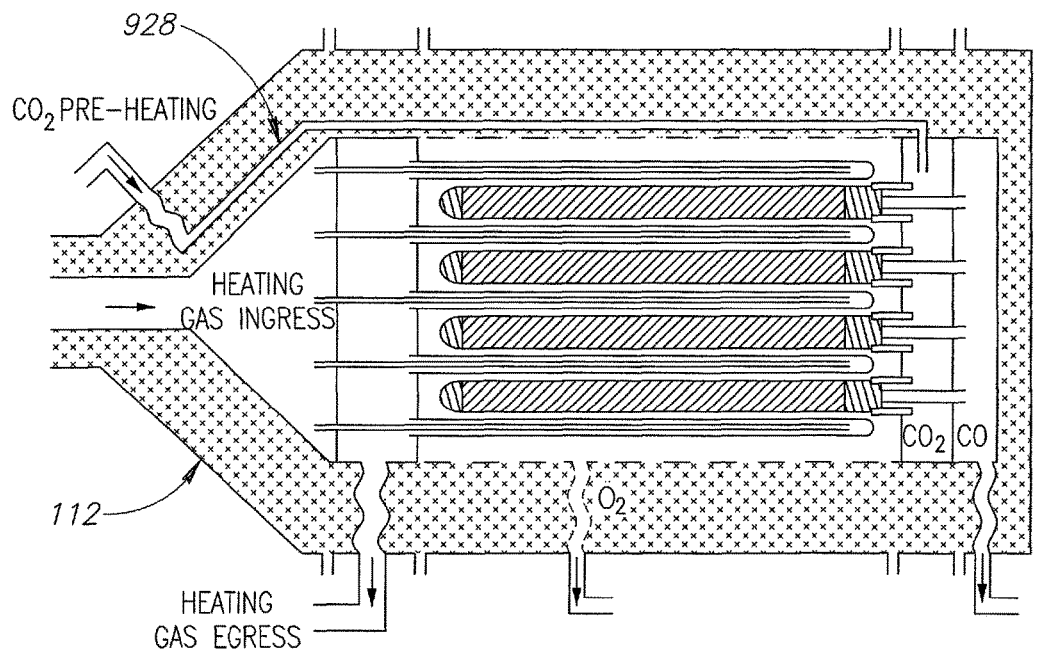
FIG. 10 illustrates an example of a reactor similar to the one shown in FIG. 8A, which comprises the option of pre-heating the raw gas prior to its entrance to the reaction units.

FIG. 10 illustrates a reactor similar to the one shown in FIG. 8A, but additionally comprises the option of pre-heating the raw gas (e.g. $CO_2$) prior to its conveyance to the reaction units. As shown in this specific not limiting example, a pre-heater unit (tube) 928 is provided for passing the gas therethrough, the tube 928 is located between the heating elements and the sealed casing 112.

Figure 11:
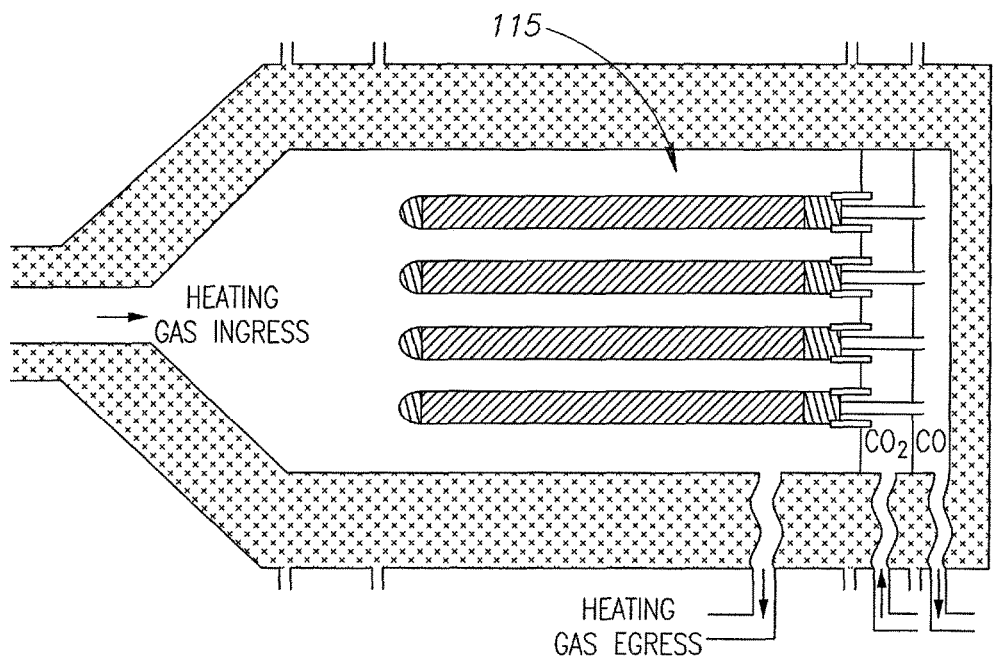
FIG. 11 demonstrates an example of a reactor in which the heating of the reaction units is done by direct contact between the heating gas and the reaction units.

FIG. 11 demonstrates a reactor in which heating of the reaction units is implemented by direct contact between a heating gas (e.g. air, $O_2$, $CO_2$ or a combination thereof) and the reaction units which are surrounded by the heating gas. In other words, the heating system is formed by heating paths for the heated gas to flow therethrough, defined by regions of the reaction zone in between the reaction units and around the array of reaction units. This configuration allows introducing the heating gas at a lower temperature than the temperature of the heating gas (e.g. air) entering in any of the preceding examples where the heating gas flows in tubes located close to the reaction units.

Figure 12:
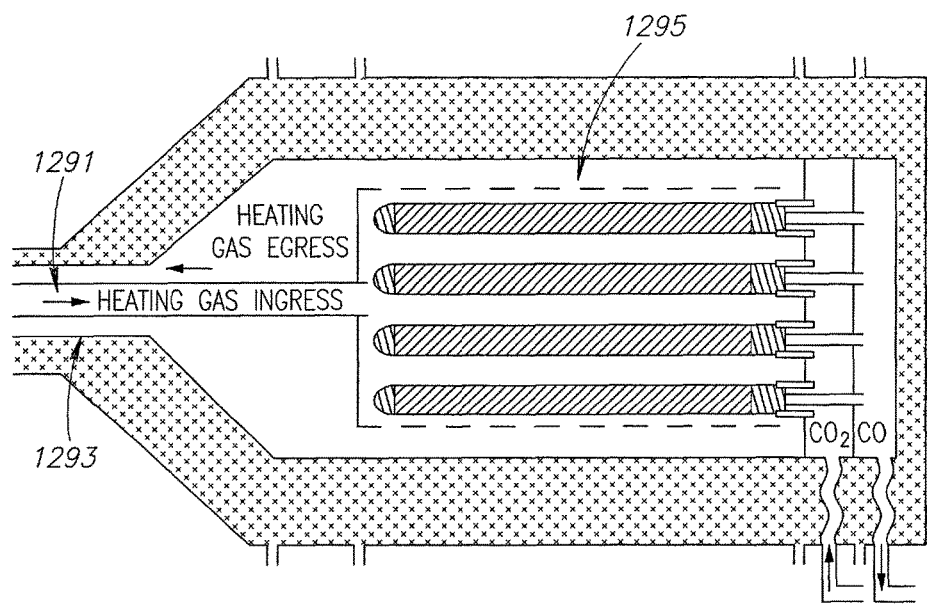
FIG. 12 demonstrates an example of a reactor similar to the one shown in FIG. 11, in which the heating of the reaction units is done by direct contact between the heating gas and the reaction units, but utilizes a perforated wall upstream of the gas egress means.

FIG. 12 demonstrates a reactor similar to the one shown in FIG. 11 in that the heating of the reaction units is done by direct contact between the heating gas (e.g. air, $O_2$, $CO_2$ or a combination thereof) and the reaction units which are surrounded by the heating gas. In the configuration shown in the example of FIG. 12, the heating gas enters the reaction chamber at ingress 1291, and leaves the reaction chamber through its perforated wall 1295 and then through egress means 1293. Optionally, the wall's perforations are distributed non-uniformly (or have different sizes) in order to control the lateral and longitudinal gas flow in the heating paths and consequently to facilitate uniform heat transfer in the reaction zone from the heating gas to the reaction units. Ingress means 1291 and egress means 1293 may be arranged in an annular configuration, with the hotter ingress means through which the hotter gas is conveyed is located at the inner part of annulus, thereby minimizing thermal losses. The direction of heating gas flow as well as the resulting reversal of roles of the plenums of the heating gas manifold is possible.

Figure 13:
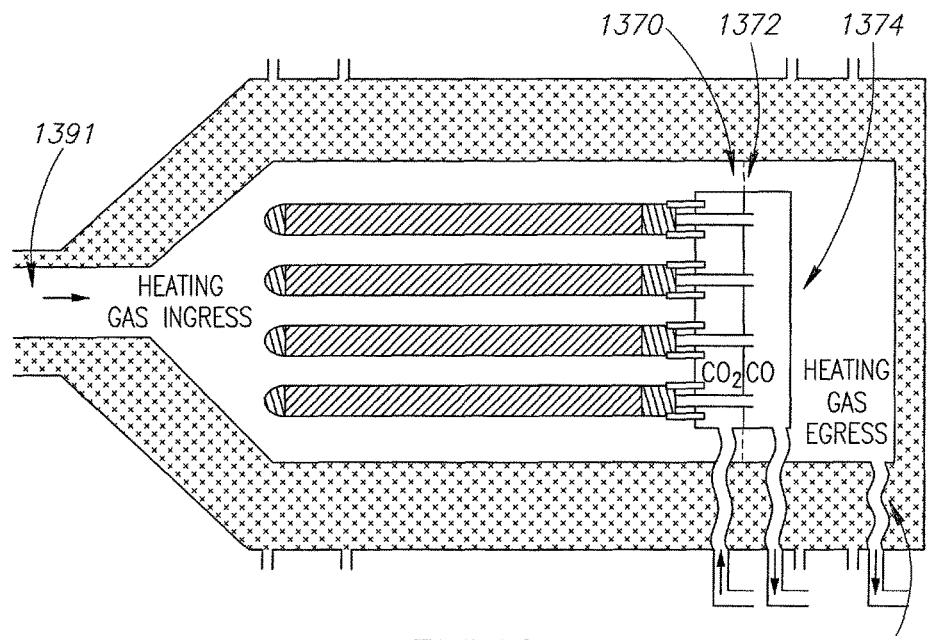
FIG. 13 demonstrates an example of a reactor similar to the one presented in FIG. 11, in which the reaction units is done by direct contact between the heating gas and the reaction units, but utilizes the gas egress means located downstream of the reaction gas manifolds, thereby reducing the need for pre-heating the reaction gas.

FIG. 13 demonstrates a reactor configured generally similar to the one presented in FIG. 11, wherein the heating of the reaction units is done by direct contact between the heating gas and the reaction units, surrounded by the heating gas. In the configuration demonstrated in the example of FIG. 13, the heating gas enters the reaction chamber at ingress 1391 and leaves through egress means 1393, whereas the egress means are located downstream of the reaction gas manifolds, thereby facilitating heat transfer to the manifolds and reducing the need for pre-heating the reaction gas. The reaction gas manifolds may be supported by a flexible or a stiff holder (e.g. a plate) 1370. Holder 1370 includes perforations 1372 which enable the heating gas to pass through. The shape of the cavity 1374 surrounding the reaction gas manifolds may be optimized to facilitate heat transfer to these manifolds. Optionally, the perforations 1372 may be distributed non-uniformly (or have different sizes) in order to control the gas flow and consequently to facilitate heat transfer from the heating gas to the reaction gas manifolds.

Figure 14:
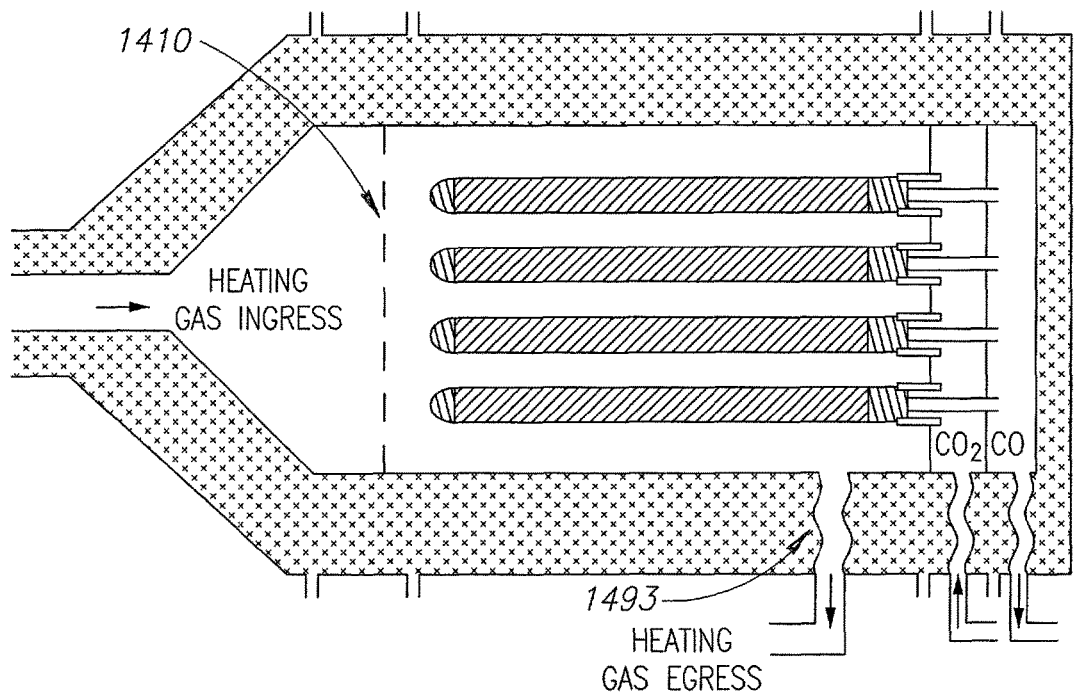
FIG. 14 demonstrates an example of a reactor similar to the one illustrated in FIG. 11, in which the heating of the reaction units is done by direct contact between the heating gas and the reaction units, but which utilizes a perforated plate associated with the gas ingress means.

FIG. 14 demonstrates a reactor which is also generally similar to the one illustrated in FIG. 11, wherein the heating of the reaction units is done by direct contact between the heating gas and the reaction units, surrounded by the heating gas. In the configuration exemplified in FIG. 14, the heating gas enters the reaction chamber through a perforated plate 1410, and leaves the reaction chamber through egress means 1493. The cross sectional dimension (e.g. diameter) of the perforations and their locations in the plate 1410 are designed to optimize the flow in the heating paths defined by regions of the reaction zone in between the reaction units and around the array of reaction units thereby optimizing the heat transfer from the heating gas to the reaction units with respect to heat transfer efficiency and/or temperature uniformity of the reaction units. Optionally, the perforations in plate 1410 may be distributed non-uniformly (or have different sizes) in order to control the gas flow and consequently to facilitate heat transfer from the heating gas to the reaction units.

Although the above disclosure has been illustrated by way of applying tubular reaction units made of certain materials, it should be understood that the present invention is not restricted to such materials or configuration and may be applied to other designs as well, mutates mutandis.

It is to be understood that the present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It should be noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art, e.g. the use of a processor to carry out at least some of the functions described as being carried out by the detector of the present invention. Therefore, the scope of the invention is limited only by the elements and limitations as used in the claims. When used in the following claims, the terms "comprise", "include", "have" and their conjugates mean "including but not limited to".

The invention claimed is:

1. A reactor comprising:
a plurality of reaction units located within a reaction zone in the reactor, each of the reaction units being adapted to enable carrying out a chemical reaction of one or more raw gases;
ingress means operative to allow introduction of the one or more raw gases into the reaction zone and to allow distributing the incoming one or more raw gases to the plurality of the reaction units;
egress means operative to allow exit of reaction products from the reaction zone; and
a heating system comprising a plurality of heating paths within the reaction zone, the heating paths comprising at least external heating paths located in and extending along spaces between at least some of the reaction units to provide efficient heat transfer to the reaction units and provide at least a part of energy to carry out the reaction process within the plurality of reaction units;
wherein each of at least some of the reaction units comprises:
an active shell having a space defined therein through which said one or more raw gases flow and in which the chemical reaction occurs, said active shell at its first end having an opening configured for introduction of the one or more raw gases into the reaction unit; and
an inner shell passing through the active shell and being configured to define said space of the active shell around the inner shell for said flow of the one or more raw gases;
wherein the reaction units extend essentially along a longitudinal axis of the reaction zone and are arranged in a spaced-apart relationship along a lateral axis of the reaction zone, and
wherein the inner shell is a tube that defines a path for a gas flow there-through to provide the gas flow into and out of said space of the active shell for at least one of raw gases and reaction products and a heating gas.

2. The reactor of claim 1, wherein the heating system comprises at least one of the following: one or more external heating elements interposed between at least two adjacent reaction units, one or more heating elements interposed between the adjacent reaction units and comprising one or more tubes, one or more heating elements interposed between the adjacent reaction units and comprising one or more tubes that include at least one of: a substantially U-shaped tube, and an annular tube.

3. The reactor of claim 1, wherein the heating system comprises a plurality of heating elements arranged in an array of the heating paths defined by the spaces between the adjacent reaction units and a region of the reaction zone around the reaction units such that the heating gas is in direct contact with the reaction units which are surrounded by the heating gas.

4. The reactor of claim 3, comprising at least one perforated plate extending along the reaction zone aside of the reaction units, whereby energy transfer is enhanced by perforations located in the path of the gas flow.

5. The reactor of claim 3, comprising at least one perforated plate, whereby energy transfer is enhanced by perforations located in the path of the gas flow and wherein said perforated plate is characterized by at least one of the following: (a) the perforations are distributed non-uniformly along the plate; (b) the perforations include perforations of different sizes, thereby enabling to control lateral and longitudinal gas flows and consequently to facilitate uniform heat transfer from the heating gas to the reaction units.

6. The reactor of claim 1, wherein said heating system further comprises internal heating elements defining internal heating paths extending longitudinally along respective reaction units and include one of the following: a tube through which heated gas is flowing along a respective reaction unit, an electrical heating element extending along a reaction unit, and an electrical heating element located within a tube that extends along a respective reaction unit.

7. The reactor of claim 1, wherein the plurality of reaction units are of tubular configuration and have at least one of the following configurations: (1) comprise the active shell configured as a close end unit, such that one end of the unit has an opening configured to enable introduction of the raw gas into the reaction unit and withdrawal of at least one of the reaction products therefrom, and an opposite end being blocked to prevent any flow of gases through the blocked end; (2) comprise the reaction unit configured as an open end unit.

8. The reactor of claim 1, wherein said one or more raw gases comprise at least one of $CO_2$ and $H_2O$.

9. A method for controlling a dissociation reaction of at least one of $CO_2$ and $H_2O$ raw gases, the method comprising:
providing the reactor of claim 1;
introducing said at least one of $CO_2$ and $H_2O$ raw gases into the reaction zone via the gas ingress thereby causing the one or more raw gases to pass through said spaces of the active shells of the multiple reaction units, and
operating said heating system for applying high-temperature heating to the reaction units via said heating paths, thereby providing at least part of energy required to carry out the reaction process within the multiple reaction units.

10. The method according to claim 9, wherein the heating sources comprise heated gas flowing through inner shells of the respective reaction units, such that the one or more raw gases flow in each of the reaction units in a space around the inner shell.

11. The method according to claim 9, wherein the heating sources comprise heated gas flowing through the spaced-apart reaction zone along spaces between the reaction units and around the reaction units' arrangement.

12. The method according to claim 9, wherein the heated gas is introduced to the reaction zone at a certain relatively high temperature, is directed to flow along a plurality of paths associated with the multiple reaction units, and leaves the reaction zone at a reduced temperature, thereby providing said at least part of the energy required to carry out the reaction within the reaction units.

13. The method according to claim 12, wherein the temperature of the heated gas is reduced by about 10%-50%.

14. The reactor of claim 1, wherein said active shell comprises at least a cathode layer or an anode layer or both.

15. The reactor of claim 1, wherein said active shell comprises at least a cathode layer, an electrolyte layer and an anode layer.

16. The reactor of claim 1, further comprising one or more outer shells, the outer shell being associated with one or more of the active shells of the one or more reaction units.

17. The reactor of claim 16, wherein said at least one outer shell defines a space surrounding the active shells for a flow of a product of the reaction process in said space.

18. The reactor according to claim 6, wherein said internal heating paths comprise paths defined by tubular spaces inside the inner shells.

19. The reactor according to claim 1, wherein said external heating paths further comprise paths defined by a space around an arrangement of the plurality of reaction units.

20. The reactor according to claim 1, wherein said heating system comprises heating sources comprising physical heating elements through which heated gas flows through the reaction zone.

21. The reactor according to claim 20, wherein the physical heating elements comprise at least one of the following: (i) internal heating elements passing through the respective reaction units; (ii) external heating elements located aside the reaction units and interposed between the adjacent reaction units.

* * * * *